(12) United States Patent
Harris et al.

(10) Patent No.: US 10,822,280 B2
(45) Date of Patent: Nov. 3, 2020

(54) METHOD OF MAKING A FIBER PREFORM FOR CERAMIC MATRIX COMPOSITE (CMC) FABRICATION UTILIZING A FUGITIVE BINDER

(71) Applicant: Rolls-Royce High Temperature Composites Inc., Cypress, CA (US)

(72) Inventors: Stephen Harris, Long Beach, CA (US); David Smolenski, Huntington Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 58 days.

(21) Appl. No.: 16/116,173

(22) Filed: Aug. 29, 2018

(65) Prior Publication Data

US 2019/0185385 A1  Jun. 20, 2019

Related U.S. Application Data

(60) Provisional application No. 62/599,154, filed on Dec. 15, 2017.

(51) Int. Cl.
  *C04B 35/80* (2006.01)
  *C04B 35/628* (2006.01)
  (Continued)

(52) U.S. Cl.
  CPC ............ *C04B 35/806* (2013.01); *B29B 11/00* (2013.01); *B29C 48/00* (2019.02); *B29C 70/00* (2013.01); *B32B 5/024* (2013.01); *B32B 9/005* (2013.01); *B32B 37/153* (2013.01); *B32B 38/0036* (2013.01); *C04B 35/62863* (2013.01); *C04B 35/62871* (2013.01); *C04B 35/62894* (2013.01); *C04B 35/638* (2013.01); *C04B 35/63416* (2013.01); *C04B 35/63444* (2013.01);
  (Continued)

(58) Field of Classification Search
  CPC . C04B 35/573; C04B 35/645; C04B 2237/36; C04B 2237/361; C04B 35/195; C04B 35/62227; C04B 35/64; C04B 37/008; C04B 2237/38
  See application file for complete search history.

(56) References Cited

U.S. PATENT DOCUMENTS 5,395,648 A  3/1995 Davis et al.
5,432,253 A * 7/1995 Singh .................... B32B 18/00
                                              428/408

(Continued)

*Primary Examiner* — Alex B Efta
(74) *Attorney, Agent, or Firm* — Brinks Gilson & Lione

(57) ABSTRACT

A method of making a fiber preform for ceramic matrix composite (CMC) fabrication comprises laminating an arrangement of fibers between polymer sheets comprising an organic polymer, which may function as a fugitive binder during fabrication, to form a flexible prepreg sheet. A plurality of the flexible prepreg sheets are laid up in a predetermined geometry to form a stack, and the stack is heated to soften the organic polymer and bond together the flexible prepreg sheets into a bonded prepreg structure. Upon cooling of the bonded prepreg structure, a rigid preform is formed. The rigid preform is heated at a sufficient temperature to pyrolyze the organic polymer. Thus, a porous preform that may undergo further processing into a CMC is formed.

20 Claims, 1 Drawing Sheet

(51) Int. Cl.
  *C04B 35/634* (2006.01)
  *C04B 35/638* (2006.01)
  *C04B 35/657* (2006.01)
  *C04B 37/00* (2006.01)
  *B29C 70/00* (2006.01)
  *B29C 48/00* (2019.01)
  *B29C 48/08* (2019.01)
  *B29B 11/00* (2006.01)
  *B32B 37/15* (2006.01)
  *B32B 38/00* (2006.01)
  *C08J 5/12* (2006.01)
  *B32B 5/02* (2006.01)
  *B32B 9/00* (2006.01)
  *C08J 5/24* (2006.01)
  *B32B 37/20* (2006.01)

(52) U.S. Cl.
  CPC ...... *C04B 35/63464* (2013.01); *C04B 35/657* (2013.01); *C04B 37/008* (2013.01); *C08J 5/121* (2013.01); *C08J 5/24* (2013.01); *B32B 37/203* (2013.01); *B32B 2260/021* (2013.01); *B32B 2260/04* (2013.01); *B32B 2262/105* (2013.01); *C04B 2235/3826* (2013.01); *C04B 2235/524* (2013.01); *C04B 2235/5244* (2013.01); *C04B 2235/604* (2013.01); *C04B 2235/616* (2013.01); *C04B 2237/38* (2013.01); *C08J 2329/04* (2013.01); *C08J 2339/06* (2013.01); *C08J 2369/00* (2013.01)

(56) References Cited

U.S. PATENT DOCUMENTS

| | | | |
|---|---|---|---|
| 5,589,115 A * | 12/1996 | Sherwood | C04B 35/80 156/89.26 |
| 7,045,083 B2 | 5/2006 | Gardner | |
| 2006/0118984 A1* | 6/2006 | Farber | B22F 3/1125 264/44 |
| 2007/0023975 A1* | 2/2007 | Buckley | B29B 11/16 264/494 |
| 2012/0171430 A1* | 7/2012 | Riedell | F16J 15/104 428/189 |
| 2015/0328799 A1* | 11/2015 | Szweda | C04B 35/117 156/510 |
| 2016/0214356 A1* | 7/2016 | Sheedy | C04B 35/563 |

* cited by examiner

METHOD OF MAKING A FIBER PREFORM FOR CERAMIC MATRIX COMPOSITE (CMC) FABRICATION UTILIZING A FUGITIVE BINDER

RELATED APPLICATIONS

The present patent document claims the benefit of priority under 35 U.S.C. § 119(e) to U.S. Provisional Patent Application Ser. No. 62/599,154, filed Dec. 15, 2017, and which is hereby incorporated by reference in its entirety.

TECHNICAL FIELD

The present disclosure is directed generally to ceramic matrix composite (CMC) fabrication and more specifically to a method to improve the preforming process.

BACKGROUND

A typical method for the production of silicon carbide (SiC) based ceramic matrix composites includes weaving dry fiber into a two-dimensionally (2D) woven fabric or drum-winding to form a unidirectional tape, preforming the fabric or tape to the desired geometry, coating the fiber preform with a fiber interphase, rigidizing the preform with silicon carbide using chemical vapor infiltration (CVI), infiltrating a ceramic slurry into the rigidized preform, and subsequently melt infiltrating with molten silicon or an alloy thereof to form a ceramic matrix composite.

Since the preforming process sets the initial component geometry and also determines the skeletal material structure for subsequent processing operations, it is paramount that the fabric or tape can conform to the desired curvatures and be sufficiently immobilized such that there is no distortion on the bulk level or the individual fiber tow/filament level.

In some cases, the preforming process may utilize the native "sizing" on the fiber, which is typically composed of polyvinyl alcohol (PVA), polyethylene oxide (PEO) or another low char-yielding high purity polymer, along with a solvent or polymer solution to perform a "wet" layup of the fabric/tape into the desired geometry; then the preform is dried or cured while constrained in the tool to yield a rigid preform. This preform can then be placed in a high-temperature capable tool for ridigization and the polymer can be pyrolized to leave the fiber essentially bare for CVI. While this method may be effective in some cases, it can lead to considerable inhomogeneity in the preform due to non-uniform fiber compaction, particularly around tight radii, poor control of individual tow aspect ratios, preform skew and delamination, and generally insufficient control over the fabric/tape placement.

BRIEF SUMMARY

An improved method of making a fiber preform for ceramic matrix composite (CMC) fabrication that utilizes a fugitive binder is described herein. The fiber preform may exhibit both a controlled tow aspect ratio and uniform fiber compaction.

The method comprises laminating an arrangement of fibers between polymer sheets comprising an organic polymer, which may function as a fugitive binder during fabrication, to form a flexible prepreg sheet. A plurality of the flexible prepreg sheets are laid up in a predetermined geometry to form a stack, and the stack is heated to soften the organic polymer and bond together the flexible prepreg sheets into a bonded prepreg structure. Upon cooling of the bonded prepreg structure, a rigid preform is formed. The rigid preform is then heated at a sufficient temperature to pyrolyze the organic polymer. Thus, a porous preform that may undergo further processing into a CMC is formed.

DETAILED DESCRIPTION

A method of pre-impregnating a fabric or tape with a polymeric binder to immobilize the fibers in a tacky, flexible, and low char-yielding polymer has been developed to form flexible prepreg sheets for ceramic matrix composite (CMC) fabrication. The flexible prepreg sheets are laid up to form a preform of any desired geometry during a preforming step. The prepreg method allows pre-compaction of the fabric or tape to the desired thickness, thereby enabling a controlled tow aspect ratio and uniform fiber compaction in the preform. After lay-up, the flexible prepreg sheets undergo a bonding step to form a rigid preform, and, in a subsequent step, the polymeric binder (organic polymer) is removed by pyrolysis. The polymeric binder may be referred to as a fugitive binder since it is employed during fabrication of the CMC but does not appear in the final composite. After pyrolysis, the resulting porous preform may then undergo further processing into a CMC.

Figure 1A:
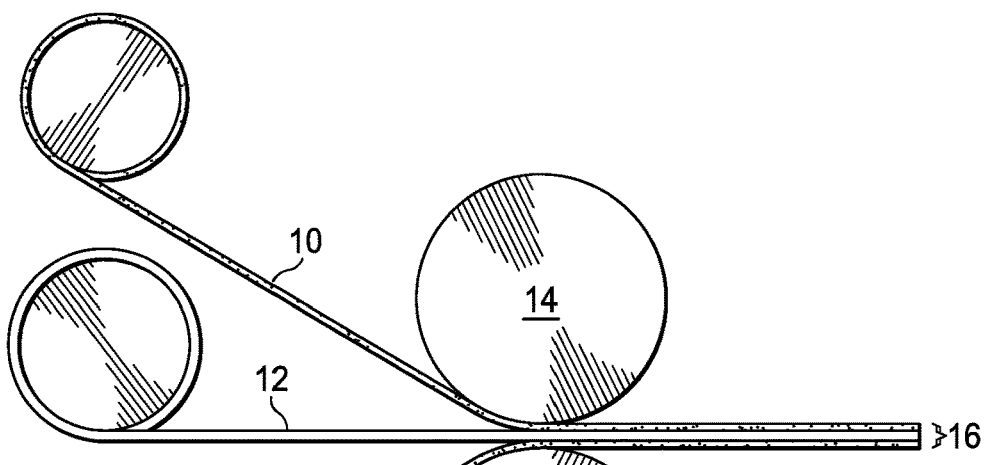
FIG. 1A is a schematic showing an exemplary laminating process to form a flexible prepreg sheet.

Referring now to FIG. 1A, the method entails laminating an arrangement of fibers between polymer sheets in order to form a flexible prepreg sheet. The polymer sheets comprise an organic polymer (e.g., an aliphatic organic polymer) that is preferably high purity and low char-yielding. The arrangement of fibers may be a 2D woven arrangement, a unidirectional arrangement, or another suitable arrangement of fibers. The fibers employed in the process are typically ceramic fibers, and they may also be continuous fibers having a length much greater than the diameter or width. As illustrated in FIG. 1A, the lamination may comprise feeding the polymer sheets 10 and the arrangement of fibers 12 into opposing rollers 14 in a continuous or batch process, and extracting a laminated product (the flexible prepreg sheet) 16 from the rollers 14 on the downstream side. The lamination is typically carried out at a temperature ranging from about 80° C. to about 200° C., or from 100° C. to about 125° C., and may entail applying a compressive pressure in a range from about 50 psi (about 0.3 MPa) to about 200 psi (about 1.4 MPa). An ambient environment (e.g., air) is typically suitable for the laminating process.

Once laminated, the flexible prepreg sheet may be passively or actively cooled (e.g., via an air jet). In the process illustrated in FIG. 1A, it may be possible to control the extraction rate of the flexible prepreg sheet 16 from the rollers 14 such that the flexible prepreg sheet 16 cools as it is extracted. After lamination, the organic polymer may function as a fugitive binder for the arrangement of fibers 12 in the flexible prepreg sheet 16. Thus, in the present disclosure the terms "fugitive binder" and "organic polymer" may be used interchangeably.

Advantageously, the flexible prepreg sheet formed from the laminating process is tacky and pliable but able to retain the desired thickness, which may be determined based on the laminating parameters (e.g., roller spacing). Typically, the flexible prepreg sheet has a predetermined thickness in a range from about 0.004 in to about 0.015 in. The predetermined thickness may be substantially uniform (within ±0.001 in) along the length and width of the sheet. The flexible prepreg sheet preferably includes a homogeneous distribution of the organic polymer throughout, such that each fiber is coated with the fugitive binder. After pre-pregging, conventional "dry layup" polymer matrix composite-derived preforming methods can be utilized to improve the homogeneity of the resulting preform.

Figure 1B:
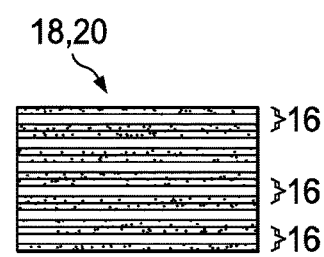
FIG. 1B shows a preform fabricated by laying up a plurality of the flexible prepreg sheets in a predetermined geometry. Each of the flexible prepreg sheets includes an arrangement of fibers in an organic polymer (or fugitive binder).

To form the preform, a number of the flexible prepreg sheets 16 formed in the lamination process are laid up in a predetermined geometry, thereby forming a stack 18 of the flexible prepreg sheets 16. For example, the predetermined geometry may be a planar stack, as shown in the schematic of FIG. 1B, or the geometry may be a curved stack or another simple or complex three-dimensional shape. The lay-up may proceed in a desired orientation sequence so as to achieve a particular orientation of each flexible prepreg sheet 16 with respect to the underlying flexible prepreg sheet 16. The stack 18 may be formed in a double-sided tool or a single-sided tool, optionally with the aid of vacuum or pressure.

The stack 18 is then heated to soften the organic polymer and bond together the flexible prepreg sheets 16 into a bonded prepreg structure. The heating of the stack 18 may be carried out at a low temperature sufficient to soften but not liquefy the polymer, and thus the low temperature may be referred to as a "softening temperature." Typically, the softening temperature is in a range from about 80° C. to about 200° C., or from about 100° C. to about 130° C. During the heating, the stack 18 may also be compressed at a low pressure (e.g., about 50 psi to about 100 psi, or about 0.3 MPa to about 0.7 MPa). Vacuum bagging or mechanical pressing may be used to compress the stack. Upon cooling, a rigid preform 20 that exhibits both a controlled tow aspect ratio and uniform fiber compaction may be obtained.

Figure 1C:
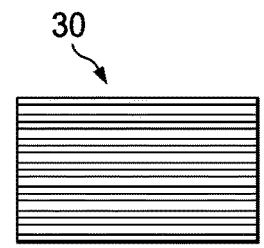
FIG. 1C is a schematic of an exemplary porous preform formed from the preform of FIG. 1B upon pyrolysis of the fugitive binder.

The rigid preform 20 is then heated at a sufficient temperature ("pyrolysis temperature") to pyrolyze the organic polymer. In other words, the organic polymer is removed from the rigid preform 20. Thus, a porous preform 30 that can be used for further CMC processing is formed, as shown schematically in FIG. 1C. The porous preform 30 comprises the arrangement of fibers as laid up during the preforming process, and thus may alternatively be referred to as a fiber preform. Typically, the laying-up, the heating of the stack 18, and the cooling are carried out in a first tool, and the heating of the rigid preform 20 to pyrolyze the fugitive binder and form the porous preform 30 is carried out in a second tool suitable for elevated temperature exposure. The pyrolysis temperature is higher than the softening temperature, and may be at least about 200° C. or at least about 250° C. and as high as about 1000° C.

Figure 2:
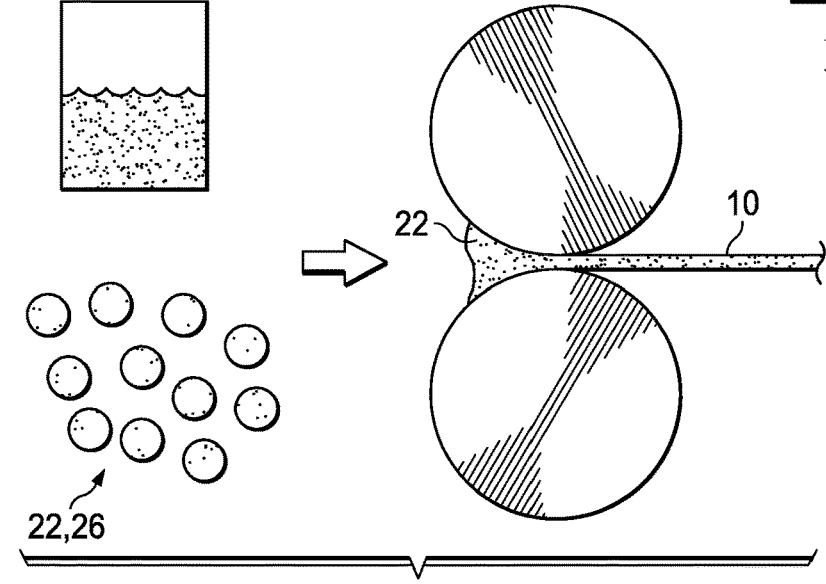
FIG. 2 is a schematic showing an exemplary fabrication process for the polymer sheets used for the laminating step.

Prior to the laminating process, each of the polymer sheets 10 may be formed by extrusion from a polymer precursor 22, as shown schematically in FIG. 2. The polymer precursor 22 may comprise a polymer solution 24 or a polymer melt formed from polymer solids (e.g., pellets) 26 that are heated for extrusion. As would be recognized by the skilled artisan, the polymer solution or melt comprises the organic polymer of the polymer sheets. The extrusion is typically carried out at a temperature in a range from about 80° C. to about 200° C., or from about 100° C. to about 125° C., and may take place in an ambient environment (e.g., air). The process may be a batch process or a continuous process. In other words, the extrusion of the polymer sheets may occur in line with the lamination process, such that the extruded sheets are formed and continuously fed into the laminating process to form the flexible prepreg sheets. Alternatively, the polymer sheets may be fabricated in a batch process separate from the lamination process or obtained from a commercial supplier prior to lamination.

The organic polymer (and fugitive binder) employed in the process may comprise a low molecular weight polymer. Also or alternatively, the organic polymer may be a $CO_2$-derived polymer. For example, the organic polymer may be selected from polyethylene carbonate, polypropylene carbonate, polyvinyl alcohol, and/or polyvinyl pyrollidone. During pyrolysis, the organic polymer forms a decomposition product that primarily or exclusively comprises carbon dioxide and water. For this reason, the organic polymer may be said to be low char-yielding.

To form a CMC from the porous preform prepared as described above, the method may further include CMC processing steps known in the art. For example, the porous preform may be coated with a fiber interphase material such as boron nitride to form a coated preform. The coated preform may be rigidized (e.g., using chemical vapor infiltration) to form a rigidized preform. Rigidization may refer to a coating process in which a matrix material such as silicon carbide is deposited on the fibers to stiffen the preform. The rigidized preform may be infiltrated with a slurry comprising a particulate matrix material to form an impregnated preform. The particulate matrix material includes ceramic particles that become part of the ceramic matrix after melt infiltration. Typically, these ceramic particles comprise silicon carbide, but they may also or alternatively include silicon nitride, alumina, and/or aluminosilicate. One or more reactive elements, such as carbon and/or refractory metals such as molybdenum or tungsten, may also be included in the slurry used to infiltrate the rigidized preform; such reactive element(s) may be present to react with the molten material during melt infiltration. The impregnated preform may be melt infiltrated with a molten metal or alloy, thereby densifying the impregnated preform and fabricating the CMC. In a preferred embodiment, the fibers of the CMC are ceramic fibers comprising silicon carbide and the ceramic matrix comprises silicon carbide. The CMC that is formed in this case may be referred to as a silicon carbide/silicon carbide or SiC/SiC composite.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method of making a fiber preform for ceramic matrix composite (CMC) fabrication, the method comprising:
    laminating an arrangement of fibers between polymer sheets consisting of an organic polymer, thereby forming a flexible prepreg sheet consisting of the polymer sheets and the arrangement of fibers, the lamination comprising feeding the polymer sheets and the arrangement of fibers into opposing rollers and extracting the flexible prepreg sheet from the opposing rollers;
    laying up a plurality of the flexible prepreg sheets in a predetermined geometry, thereby forming a stack of the flexible prepreg sheets;
    heating the stack to soften the organic polymer and bond together the flexible prepreg sheets, thereby forming a bonded prepreg structure;
    cooling the bonded prepreg structure, thereby forming a rigid preform; and
    heating the rigid preform at a sufficient temperature to pyrolyze the organic polymer, thereby forming a porous preform for further processing.

2. The method of claim 1, further comprising:
    coating the porous preform with a fiber interphase material to form a coated preform;
    rigidizing the coated preform to form a rigidized preform; and
    infiltrating the rigidized preform with a slurry comprising a particulate matrix material to form an impregnated preform; and
    melt infiltrating the impregnated preform with a molten metal or alloy, thereby fabricating a CMC.

3. The method of claim 1, wherein the laying-up, the heating of the stack, and the cooling are carried out in a first tool, and
    wherein the heating of the rigid preform to pyrolyze the organic polymer is carried out in a second tool.

4. The method of claim 1, further comprising, prior to the laminating, forming each of the polymer sheets by extrusion from a polymer precursor.

5. The method of claim 4, wherein the polymer precursor comprises a polymer solution or a polymer melt.

6. The method of claim 4, wherein the extrusion is carried out at a temperature in a range from about 80° C. to about 200° C.

7. The method of claim 1, wherein the lamination is carried out at a temperature in a range from about 80° C. to about 200° C.

8. The method of claim 1, wherein the lamination comprises a pressure in a range from about 50 psi to about 200 psi.

9. The method of claim 1, wherein the flexible prepreg sheet comprises a thickness in a range from about 0.004 in to about 0.015 in.

10. The method of claim 1, wherein the arrangement of fibers comprises a woven arrangement or a unidirectional arrangement.

11. The method of claim 1, wherein the predetermined geometry comprises a planar or curved shape.

12. The method of claim 1, wherein the heating of the stack is carried out at a softening temperature in a range from about 80° C. to about 200° C.

13. The method of claim 1, further comprising, during the heating of the stack, compressing the stack at a pressure in a range from about 50 psi to about 100 psi.

14. The method of claim 13, wherein the compression of the stack comprises vacuum bagging or pressing.

15. The method of claim 1, wherein the heating of the rigid preform to pyrolyze the organic polymer is carried out at a pyrolysis temperature in a range from about 200° C. to about 1000° C.

16. The method of claim 1, wherein the organic polymer is selected from the group consisting of polyethylene carbonate, polypropylene carbonate, polyvinyl alcohol, and polyvinyl pyrollidone.

17. The method of claim 1, wherein a decomposition product of the organic polymer during pyrolysis consists of carbon dioxide and water.

18. The method of claim 1, wherein the fibers comprise a ceramic selected from the group consisting of silicon carbide and silicon nitride.

19. The method of claim 1, wherein the fibers are continuous fibers comprising silicon carbide, and the CMC includes a matrix comprising silicon carbide.

20. A method of making a fiber preform for ceramic matrix composite (CMC) fabrication, the method comprising:
    laminating an arrangement of fibers between polymer sheets consisting of an organic polymer, thereby forming a flexible prepreg sheet consisting of the polymer sheets and the arrangement of fibers;
    laying up a plurality of the flexible prepreg sheets in a predetermined geometry, thereby forming a stack of the flexible prepreg sheets;
    heating the stack to soften the organic polymer and bond together the flexible prepreg sheets, thereby forming a bonded prepreg structure;
    cooling the bonded prepreg structure, thereby forming a rigid preform; and
    heating the rigid preform at a sufficient temperature to pyrolyze the organic polymer, thereby forming a porous preform for further processing.

* * * * *